(12) United States Patent
Hornback et al.

(10) Patent No.: US 9,737,907 B2
(45) Date of Patent: Aug. 22, 2017

(54) ANTI-DEPOSIT FORMING SURFACE FINISH FOR EXHAUST SYSTEM MIXER

(71) Applicant: Faurecia Emissions Control Technologies, USA, LLC, Columbus, IN (US)

(72) Inventors: Jerome Brian Hornback, Greenwood, IN (US); Chris Chapman, Columbus, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 134 days.

(21) Appl. No.: 14/430,950

(22) PCT Filed: Sep. 28, 2012

(86) PCT No.: PCT/US2012/057693
§ 371 (c)(1),
(2) Date: Mar. 25, 2015

(87) PCT Pub. No.: WO2014/051598
PCT Pub. Date: Apr. 3, 2014

(65) Prior Publication Data
US 2015/0211398 A1   Jul. 30, 2015

(51) Int. Cl.
*B01D 50/00*   (2006.01)
*B05D 5/08*   (2006.01)
(Continued)

(52) U.S. Cl.
CPC ............ *B05D 5/08* (2013.01); *B01D 53/92* (2013.01); *B01F 3/04021* (2013.01);
(Continued)

(58) Field of Classification Search
CPC ... F01N 3/20; F01N 3/28; F01N 13/00; F01N 3/035; F01N 13/16; B01D 53/92
(Continued)

(56) References Cited

U.S. PATENT DOCUMENTS 6,527,865 B1 *  3/2003  Sajoto .................. C23C 16/4401
                                                       118/715
7,963,104 B2    6/2011  Girard et al.
(Continued)

FOREIGN PATENT DOCUMENTS

JP   11-159320 A    6/1999
JP   H11159320 A   6/1999
(Continued)

OTHER PUBLICATIONS

International Preliminary Report on Patentability for PCT Application No. PCT/US2012/057693, mailed Apr. 9, 2015.

*Primary Examiner* — Tom P Duong
(74) *Attorney, Agent, or Firm* — Carlson, Gaskey & Olds, PC

(57) ABSTRACT

A vehicle exhaust system includes a mixer having an inlet that receives engine exhaust gases and an outlet to direct swirling engine exhaust gas to a downstream exhaust component. The mixer has a plurality of internal surfaces that come into contact with the engine exhaust gases. At least one of the internal surfaces has a coating comprised of a low-coefficient of friction material.

15 Claims, 3 Drawing Sheets

(51) Int. Cl.
*F01N 3/20* (2006.01)
*F01N 3/24* (2006.01)
*F01N 13/10* (2010.01)
*F01N 3/035* (2006.01)
*F01N 13/00* (2010.01)
*B01D 53/92* (2006.01)
*B01F 3/04* (2006.01)
*B01F 5/06* (2006.01)
*B01F 15/00* (2006.01)
*F01N 3/28* (2006.01)
*F01N 13/16* (2010.01)
*B05D 1/02* (2006.01)
*B05D 7/22* (2006.01)
*B21D 22/02* (2006.01)
*B01F 5/00* (2006.01)

(52) U.S. Cl.
CPC .......... *B01F 5/0606* (2013.01); *B01F 5/0615* (2013.01); *B01F 15/00844* (2013.01); *B05D 1/02* (2013.01); *B05D 7/22* (2013.01); *B21D 22/02* (2013.01); *F01N 3/035* (2013.01); *F01N 3/2066* (2013.01); *F01N 3/24* (2013.01); *F01N 3/2892* (2013.01); *F01N 13/009* (2014.06); *F01N 13/10* (2013.01); *F01N 13/16* (2013.01); *B01F 2005/0097* (2013.01); *F01N 2240/20* (2013.01); *F01N 2510/06* (2013.01); *F01N 2610/00* (2013.01); *F01N 2610/02* (2013.01); *F01N 2610/1453* (2013.01); *Y02T 10/24* (2013.01)

(58) Field of Classification Search
USPC .......................................... 422/168; 366/336
See application file for complete search history.

(56) References Cited

U.S. PATENT DOCUMENTS

| | | | |
|---|---|---|---|
| 8,114,364 | B2 | 2/2012 | Harinath et al. |
| 2004/0047232 | A1* | 3/2004 | Terentiev ............ B01F 7/00908 366/273 |
| 2009/0031714 | A1* | 2/2009 | Jochumsen ........... F01N 3/2066 60/303 |
| 2011/0162347 | A1* | 7/2011 | Katare ...................... F01N 3/10 60/274 |
| 2012/0204541 | A1* | 8/2012 | Li ...................... B01F 3/04049 60/274 |
| 2012/0216513 | A1 | 8/2012 | Greber et al. |

FOREIGN PATENT DOCUMENTS

| | | |
|---|---|---|
| JP | 2006167576 A | 6/2006 |
| KR | 10-0986358 B1 | 10/2010 |
| WO | 2010088208 | 8/2010 |

* cited by examiner

ANTI-DEPOSIT FORMING SURFACE FINISH FOR EXHAUST SYSTEM MIXER

BACKGROUND OF THE INVENTION

A vehicle exhaust system conducts hot exhaust gases generated by an engine through various exhaust components to reduce emissions and control noise. The exhaust system includes an injection system that injects a reducing agent, such as a solution of urea and water for example, upstream of a selective catalytic reduction (SCR) catalyst. A mixer is positioned upstream of the SCR catalyst and mixes engine exhaust gases and products of urea transformation.

The injector typically sprays the urea into the exhaust stream. The spray makes contact with the mixer and surrounding walls which have been heated by the exhaust gases. As droplets of the urea contact these heated structures, the surfaces cool down which favors a local formation of urea deposits. These deposits can adversely affect flow circulation and operating efficiency.

SUMMARY OF THE INVENTION

In one exemplary embodiment, a vehicle exhaust system includes a mixer having an inlet that receives engine exhaust gases and an outlet to direct swirling engine exhaust gas to a downstream exhaust component. The mixer has a plurality of internal surfaces that come into contact with the engine exhaust gases. At least one of the internal surfaces has a coating comprised of a low-coefficient of friction material.

In a further embodiment of the above, all of the internal surfaces include a coating comprised of the low-coefficient of friction material.

In a further embodiment of any of the above, the low-coefficient of friction material comprises a non-stick material, such as Teflon® for example.

In a further embodiment of any of the above, the mixer includes at least one baffle configured to swirl the engine exhaust gases, and wherein the plurality of internal surfaces includes a plurality of internal baffle surfaces for the at least one baffle, the internal baffle surfaces including the coating.

In a further embodiment of the above, the at least one baffle comprises at least an upstream baffle and a downstream baffle, and wherein both the upstream and downstream baffles have internal baffle surfaces with the coating.

In one exemplary embodiment, a vehicle exhaust system includes a first exhaust component having an inlet to receive engine exhaust gases, a second exhaust component positioned downstream of the first exhaust component, and a mixer positioned downstream of the first component and upstream of the second exhaust component. The mixer has an inlet configured to receive engine exhaust gases exiting the first exhaust component and an outlet to direct swirling engine exhaust gas to the second exhaust component. The mixer has a plurality of internal surfaces that come into contact with the engine exhaust gases, and wherein at least one of the internal surfaces has a coating comprised of a low-coefficient of friction material.

In a further embodiment of the above, the exhaust system includes an injection system having a fluid supply and an injector that injects fluid from the fluid supply into the engine exhaust gases such that the mixer mixes the fluid and engine exhaust gas. The mixer includes an outer peripheral surface with an injector boss having an opening to receive the injector.

In one exemplary embodiment, a method of manufacturing a mixer for a vehicle exhaust system comprises the steps of: providing a mixer having an inlet configured to receive engine exhaust gases and an outlet to direct swirling engine exhaust gas to a downstream exhaust component, the mixer having a plurality of internal surfaces that come into contact with the engine exhaust gases, and coating a least one internal surface with a low-coefficient of friction coating.

These and other features of this application will be best understood from the following specification and drawings, the following of which is a brief description.

DETAILED DESCRIPTION

Figure 1:
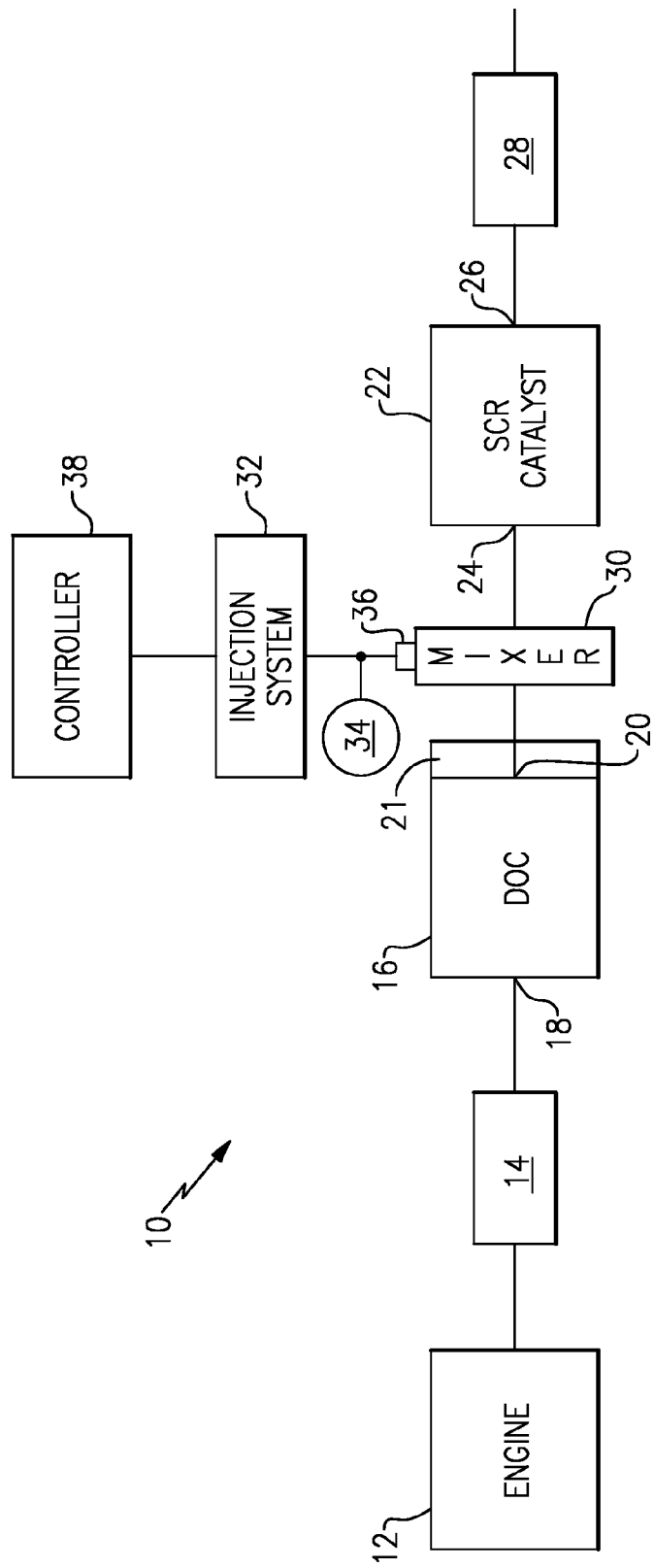
FIG. 1 schematically illustrates one example of an exhaust system with a mixer according to the subject invention.
Figure 2:
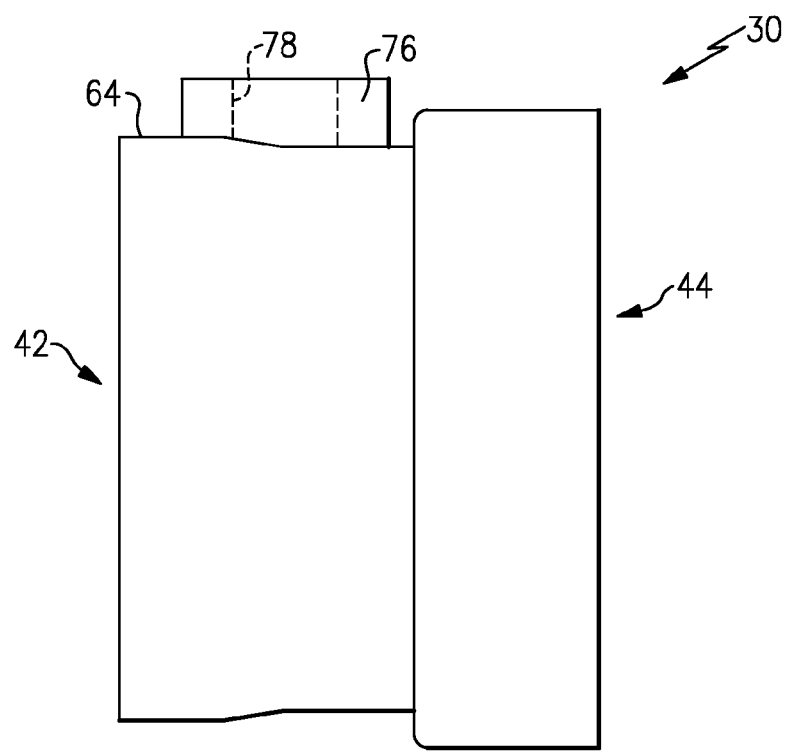
FIG. 2 is a side view of the mixer of FIG. 1.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc. In one example configuration, the upstream exhaust components 14 direct exhaust gases into a diesel oxidation catalyst (DOC) 16 having an inlet 18 and an outlet 20. Downstream of the DOC 16 is a diesel particulate filter (DPF) 21 that is used to remove contaminants from the exhaust gas as known. Downstream of the DOC 16 and DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 and upstream of the inlet 24 of the SCR catalyst 22. The mixer 30 is used to generate a swirling or rotary motion of the exhaust gas. Any type of mixing element can be used, such as that set forth in US 2012/0216513 for example, which is assigned to the assignee of the present invention and is herein incorporated by reference.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, an injector 36, and a controller 38 that controls injection of the urea as known.

The mixer 30 is shown in greater detail in FIGS. 2-5. The mixer 30 has an inlet end 42 (FIG. 2) configured to receive the engine exhaust gases and an outlet end 44 to direct a mixture of swirling engine exhaust gas and products transformed from urea to the SCR catalyst 22. As shown in the cross-sectional view of FIG. 5, the mixer 30 has a plurality of internal surfaces, indicated generally at 46, that come into contact with the urea and engine exhaust gases. As the urea contacts these surfaces, the surfaces cool which can lead to formation of urea deposits. In order to discourage formation of urea deposits, one or more of these internal surfaces has a coating comprised of a low-coefficient of friction material.

Figure 6:
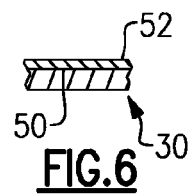
FIG. 6 is a schematic cross-sectional view showing a coating on an internal surface of the mixer.

In one example, the mixer 30 is comprised of one or more stamped metal sheets that are attached to each other. As shown in FIG. 6, one internal metal surface 50 has a coating 52 or layer of low-coefficient of friction material applied. In one example, all of the internal surfaces include a coating comprised of the low-coefficient of friction material.

Figure 3:
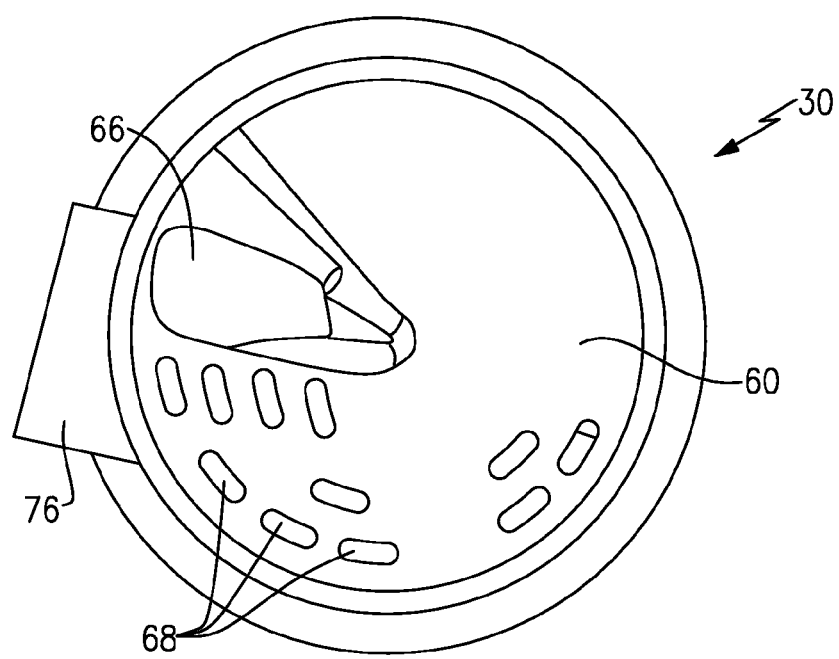
FIG. 3 is one end view of the mixer of FIG. 2.
Figure 4:
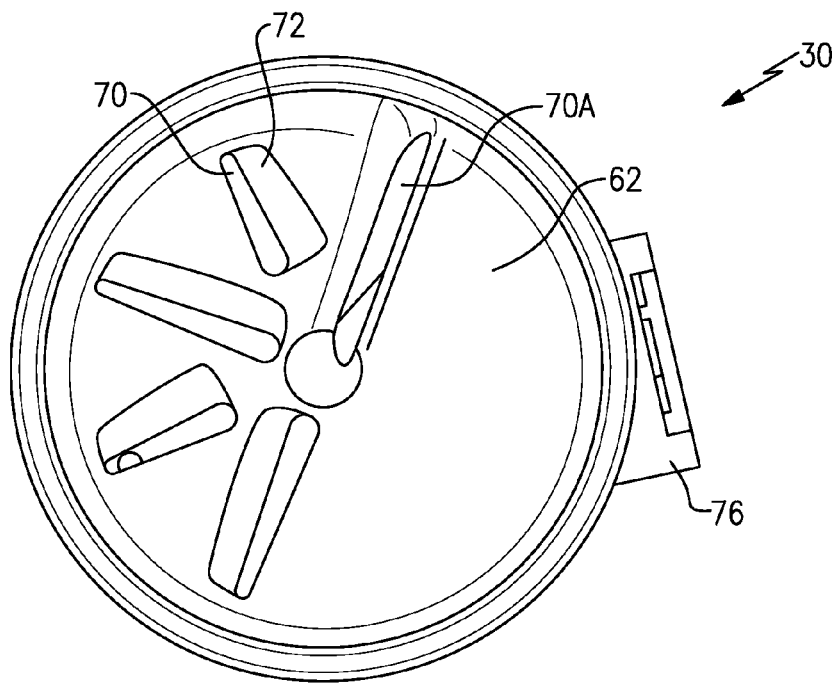
FIG. 4 is an opposite end view of the mixer of FIG. 3.
Figure 5:
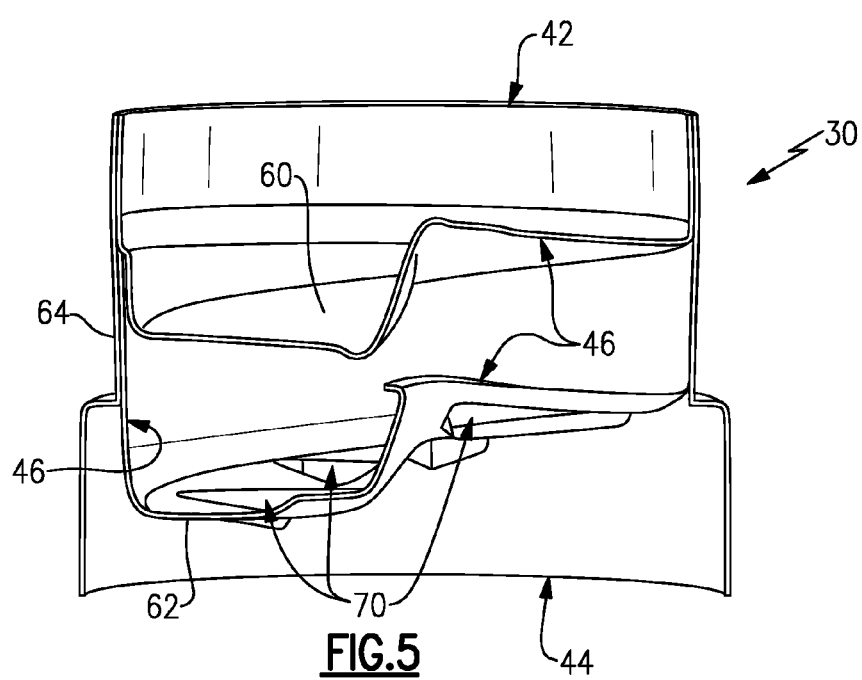
FIG. 5 is a side view similar to FIG. 2 but with a cutaway portion to show internal surfaces of the mixer.

As shown in FIGS. 3-5, the mixer 30 includes an upstream baffle 60 and a downstream baffle 62 that are surrounded by an outer peripheral surface 64. Both the upstream 60 and downstream 62 baffles have internal baffle surfaces that are covered by the coating 52. The upstream baffle 60 at the inlet 42 includes a large opening 66 (FIG. 3) that receives the majority of the exhaust gas (receives at least 60% of the exhaust mass flow rate) and which is configured to initiate the swirling motion. The upstream baffle 60 also includes a plurality of perforations 68 that ensure optimal homogenization of exhaust gases and reduces back pressure. The downstream baffle 62 includes a plurality of openings 70 and deflector portions 72 through which the exhaust gas exits. The main exit of the mixture is through the largest opening 70A (FIG. 4). Additional details regarding the operation of the upstream 60 and downstream baffles 62 can be found in US 2012/0216513.

The outer peripheral surface 64 of the mixer 30 includes an injector boss 76 having an opening 78 to receive the injector 36. The opening 78 is generally positioned axially between the upstream 60 and downstream 62 baffles such that urea is sprayed into a swirling gas flow that is initiated by the upstream baffle 60.

As discussed above, the internal surfaces of the mixer 30 are coated with a low-coefficient of friction material to discourage the formation of urea deposits. This low-coefficient of friction material must be able to perform under severe operating conditions, which include a corrosive and high temperature environment, without degrading. In one example, the low-coefficient of friction material comprises a non-stick material. One example of a non-stick material is Teflon®, for example; however, other low-coefficient of friction materials could also be used.

In one example, a method for manufacturing the mixer 30 includes the following steps. A mixer 30 is provided to have an inlet 42 configured to receive engine exhaust gases and an outlet 44 to direct swirling engine exhaust gas to a downstream exhaust component. In one example, the mixer body is formed from a plurality of stamped metal sheets. The mixer has a plurality of internal surfaces that will come into contact with the engine exhaust gases. One or more of the internal surfaces are coated with the coating 52. The coating can be sprayed onto the desired areas, the entire mixer can be sprayed, or the mixer could be dipped into the coating material. These are just some examples of how the coating is applied, it should be understood that other coating methods could also be used.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer for a vehicle exhaust system comprising:
a mixer body having an inlet configured to receive engine exhaust gases and an outlet to direct swirling engine exhaust gas to a downstream exhaust component, the mixer body having a plurality of internal surfaces that come into contact with the engine exhaust gases, and wherein at least one of the internal surfaces has a coating comprised of a low-coefficient of friction material; wherein the mixer has an upstream end configured to be fixed to an upstream exhaust component and a downstream end configured to be fixed to the downstream exhaust component, and further including an upstream baffle and a downstream baffle that are surrounded by an outer peripheral surface to define an area between the upstream and downstream baffles, and wherein both the upstream and downstream baffles have internal baffle surfaces facing the area that are in contact with hot engine exhaust gases and that are covered by the coating.

2. The mixer according to claim 1 wherein all of the internal surfaces include a coating comprised of the low-coefficient of friction material.

3. The mixer according to claim 1 wherein the outer peripheral surface has an injector boss having an opening to receive an injector, and wherein the opening is positioned axially between the upstream and downstream baffles.

4. The mixer according to claim 1 wherein the low-coefficient of friction material comprises a non-stick material.

5. The vehicle exhaust system according to claim 1 wherein the outer peripheral surface of the mixer includes an injector boss having an injector opening to receive an injector, wherein the injector opening is positioned axially between the upstream and downstream baffles such that an injected fluid is sprayed into swirling engine exhaust gases in the area between the upstream and downstream baffles.

6. A vehicle exhaust system comprising:
a first exhaust component having an inlet to receive engine exhaust gases;
a second exhaust component positioned downstream of the first exhaust component;
a mixer positioned downstream of the first component and upstream of the second exhaust component, the mixer having an inlet configured to receive engine exhaust gases exiting the first exhaust component and an outlet to direct swirling engine exhaust gas to the second exhaust component, the mixer having a plurality of internal surfaces that come into contact with the engine exhaust gases, and wherein at least one of the internal surfaces has a coating comprised of a low-coefficient of friction material; wherein the mixer has an upstream end fixed to the first exhaust component and a downstream end fixed to the second exhaust component, and wherein the mixer includes an upstream baffle and a downstream baffle that are surrounded by an outer peripheral surface, and wherein both the upstream and downstream baffles have internal baffle surfaces that are in contact with hot engine exhaust gases and that are covered by the coating.

7. The vehicle exhaust system according to claim 6 wherein all of the internal surfaces include a coating comprised of the low-coefficient of friction material.

8. The vehicle exhaust system according to claim 6 wherein the low-coefficient of friction material comprises a non-stick material.

9. The vehicle exhaust system according to claim 6 including an injection system having a fluid supply and an injector that injects fluid from the fluid supply into the engine exhaust gases such that the mixer mixes the fluid and engine exhaust gas, and wherein the outer peripheral surface has an injector boss having an opening to receive the injector.

10. The vehicle exhaust system according to claim 9 wherein the opening is positioned axially between the upstream and downstream baffles.

11. The vehicle exhaust system according to claim 9 wherein the fluid comprises urea.

12. The vehicle exhaust system according to claim 6 wherein the first exhaust component comprises a diesel oxidation catalyst and/or a diesel particulate filter, and wherein the second exhaust component comprises a selective-catalytic reduction catalyst.

13. The vehicle exhaust system according to claim 6 wherein the second exhaust component comprises a catalyst configured to perform a selective catalytic reduction function and a particulate filter function.

14. The vehicle exhaust system according to claim 6 wherein the upstream baffle at the inlet includes a primary opening through which a majority of the exhaust gas flows and wherein the primary opening is configured to initiate swirling motion of the hot engine exhaust gases exiting the primary opening into an area between the upstream and downstream baffles, and wherein the upstream baffle further includes a plurality of perforations through which a remaining portion of the exhaust gas enters the area.

15. The vehicle exhaust system according to claim 14 wherein the downstream baffle includes a plurality of openings through which the exhaust gas exits the mixer, and wherein the outer peripheral surface of the mixer includes an injector boss having an injector opening to receive the injector, wherein the injector opening is positioned axially between the upstream and downstream baffles such that an injected fluid is sprayed into the swirling engine exhaust gas in the area between the upstream and downstream baffles.

* * * * *